United States Patent [19]

Miyazaki

[11] Patent Number: 5,719,728
[45] Date of Patent: Feb. 17, 1998

[54] MODE CHANGEOVER APPARATUS FOR A TAPE PLAYER WITH OVER-STROKE CORRECTION MECHANISM

[75] Inventor: Asashi Miyazaki, Miyagi-ken, Japan

[73] Assignee: Alps Electric Co., Ltd., Tokyo, Japan

[21] Appl. No.: 601,204

[22] Filed: Feb. 14, 1996

[30] Foreign Application Priority Data

Mar. 8, 1995 [JP] Japan .................. 7-048815

[51] Int. Cl.⁶ .................. G11B 15/10; G11B 15/48
[52] U.S. Cl. .................. 360/105; 360/96.3
[58] Field of Search .................. 360/105, 137, 360/96.4, 93, 90, 74.1, 73.01; 242/358, 356.4, 355.1

[56] References Cited

U.S. PATENT DOCUMENTS

| | | | |
|---|---|---|---|
| 4,680,652 | 7/1987 | Ito | 360/72.1 |
| 4,734,806 | 3/1988 | Komatsu | 360/105 |
| 4,922,357 | 5/1990 | Komatsu et al. | 360/105 |
| 4,956,734 | 9/1990 | Kamijo | 360/105 |
| 5,005,094 | 4/1991 | Komatsu et al. | 360/105 |
| 5,214,551 | 5/1993 | Kaneda | 360/105 |

*Primary Examiner*—Stuart S. Levy
*Assistant Examiner*—Brian E. Miller
*Attorney, Agent, or Firm*—Guy W. Shoup; Patrick T. Bever

[57] ABSTRACT

A mode changeover apparatus which can turn a mode changeover gear in a returning direction without the shortage of a turning force in the returning direction in the event of occurrence of over-stroking of a head base, prevent a magnetic head from moving toward a magnetic tape beyond the optimum position thereof and reliably perform a mode changeover operation. The mode changeover apparatus comprises a head base, a torsion coil spring, a head actuating cam for actuating the head base by its rotating action in the direction opposite to a biasing direction of the torsion coil spring, flat surfaces which are formed on the head actuating cam and abut against the head base at a position where a magnetic head is in contact with the magnetic head to hold the head base at the position, and which are shaped to be perpendicular to a center line passing the rotation axis of the head actuating cam and extending toward the moving direction of the head base, and to extend on the opposite sides of the center line when abutting against said head base, outer cams provided on the outer periphery of the mode changeover gear, and a boss of a pinch roller bracket which is engaged with the outer cams to provide a turning force to the mode changeover gear in the event of occurrence of the over-stroking of the head base.

3 Claims, 8 Drawing Sheets

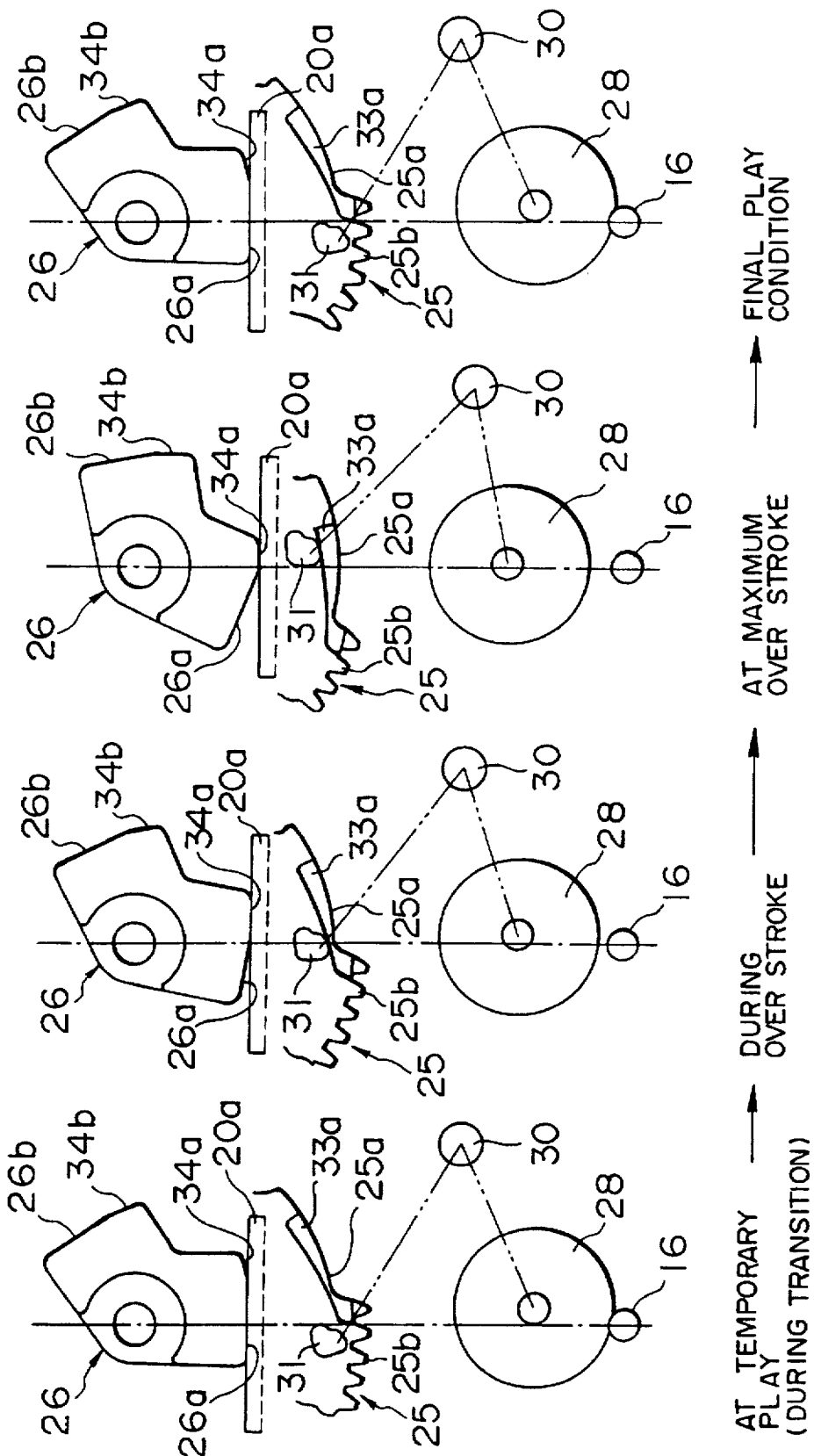

MODE CHANGEOVER APPARATUS FOR A TAPE PLAYER WITH OVER-STROKE CORRECTION MECHANISM

BACKGROUND OF THE INVENTION

1. Field of the Invention

The present invention relates to a tape player which has a mechanism for driving a head base having a magnetic head mounted thereon by a rotating action of a head actuating cam, and more particularly, to a mode changeover apparatus for a tape recorder capable of surely and stably actuating the head actuating cam.

2. Description of the Related Art

FIGS. 5 and 6 are explanatory views showing a conventional mode changeover apparatus for a tape player in a stop mode and a play mode, respectively; FIG. 7 is a plan view showing a head actuating cam and a mode changeover gear; FIG. 8 is a sectional view taken on line VIII—VIII of FIG. 7; and FIGS. 9A and 9B are explanatory views showing a head actuating cam and a tab of a head base by operation.

Such tape player is incorporated into an automatic answering telephone set and the like, and drives reels and a mode changeover gear with a planet gear turning around a driving gear so that a capstan shaft, a pair of reels and a head base can be driven by one motor.

Referring to FIGS. 5 and 6, there are provided a winding reel 12 and supplying reel 13, respectively. A base portion of the winding reel 12 is provided with a reel gear 14, and a base portion of the supplying reel 13 is provided with a reel gear 15.

A capstan shaft 16 is rotatably supported, and a flywheel 17 is formed integrally with the capstan shaft 16.

A motor M is disposed on one side of a chassis, not shown. A belt 18 is extended between a driving pulley of the motor M and the flywheel 17 to drive the capstan shaft 16 for rotation together with the flywheel 17 by the motor M. A driving gear 19 coaxially rotating with the capstan shaft 16 is provided coaxially on the upper surface of the flywheel 17. An idle arm 21 is provided on the upper portion of the driving gear 19, and a planet gear 22 is provided at the tip of the idle gear 21 so as to be always in engagement with the driving gear 19. A shaft provided on the idle arm 21 and the planet gear 22 supported thereby so as to be rotated are loaded with a small load by a means, such as a spring, so that the idle arm 21 turns in the direction of rotation of the capstan shaft 16 and the driving gear 19, and the planet gear 22 revolves around the driving gear 19 when the capstan shaft 16 and the driving gear 19 rotate in either a clockwise direction or a counterclockwise direction.

When the driving gear 19 rotates in a clockwise direction, the planet gear 22 revolves around the driving gear 19 to a position where the planet gear 22 is engaged with the winding reel gear 14 shown in FIG. 6 (play mode). When the driving gear 19 rotates in a counterclockwise direction, the planet gear 22 revolves around the driving gear 19 to a position where the planet gear 22 is engaged with the supplying reel gear 15 (review mode).

A mode changeover gear 25 is positioned so that the planet gear 22 is engaged with the mode changeover gear 25 on its turning path from the position where the planet gear 22 is engaged with the reel gear 14 to the position where the planet gear 22 is engaged with the reel gear 15. The mode changeover gear 25 has an non-toothed portion 25a and toothed portions 25b which are partially provided on the portions other than the non-toothed portion 25a.

When the toothed portions 25b face with the planet gear 22 turning around the driving gear 19, a turning force of the planet gear 22 is transmitted to the mode changeover gear 25 through the toothed portions 25b. However, when the non-toothed portion 25a faces with the planet gear 22, the planet gear 22 passes over the non-toothed portion 25a, and turns around the driving gear 19 without driving the mode changeover gear 25.

A head actuating cam 26, i.e. a cam which determines the position of the head base is formed integrally on the upper surface of the mode changeover gear 25. The head actuating cam 26 has first and second flat surfaces 26a and 26b which are abutted against a tab 20a of a head base 20 to be described later. As shown in FIG. 7, the second flat surface 26b is formed smaller than the first flat surface 26a by a short distance t from the rotation axis O of the mode changeover gear 25.

A head base 20 slidably moves in the direction (direction A-B) in which the head base 20 moves close to and away from each of the reels 12 and 13. A spring 27 is extended between the rear end of the head base 20 and the chassis (not shown) to bias the head base 20 in the direction in which the head base 20 separates from each of the reels 12 and 13 (direction B). The head base 20 is bent at its rear end portion to form a tab 20a. The tab 20a extends toward the position where it can face with and abut against the first flat surface 26a or the second flat surface 26b. A magnetic head H, and a pinch roller 28 which come in contact with or separate from the capstan shaft 16 are supported on the head base 20.

The operation of the conventional tape player thus constructed will now be described.

Stop Mode:

In the stop mode shown in FIG. 5, both of the first and second flat surfaces 26a and 26b of the head actuating cam 26 are separated from the tab 20a of the head base 20, and the head base 20 is biased by the resilience of the spring 27 in the direction B. When the head base 20 is held at a position shown in FIG. 5, the magnetic head H is separated from a magnetic tape T contained in a cassette half, and the pinch roller 28 is separated from the capstan shaft 16.

Changeover from the Stop Mode to the Play Mode:

In changing over the mode of the tape player from the stop mode to the recording or the playback mode (play mode in FIG. 6), the motor M is driven for rotation in a clockwise direction (direction shown by a broken allow in FIG. 5) in the state shown in FIG. 5. When the driving gear 19 is driven for rotation in a clockwise direction by means of the motor M, the planet gear 22 is also rotated in a clockwise direction following the rotation of the driving gear 19 to be surely engaged with the toothed portion 25b of the mode changeover gear 25. The power of the motor M is transmitted through the driving gear 19 and the planet gear 22 to the mode changeover gear 25 to drive the mode changeover gear 25 for rotation in a clockwise direction. While the mode changeover gear 25 is driven, the planet gear 22 stays at the same position.

When the mode changeover gear 25 is rotated to the position shown in FIG. 6, the non-toothed portion 25a of the mode changeover gear 25 moves to the position of the planet gear 22 so that the planet gear 22 can be disengaged from the edge Ea of the toothed portion 25b of the mode changeover gear 25. The planet gear 22 disengaged from the edge Ea is allowed to turn around the driving gear 19 in a clockwise direction and arrives at a position where the planet gear 22 is engaged with the winding reel gear 14, as shown in FIG. 6 (play mode).

During the changeover from the stop mode to the play mode shown in FIGS. 5 and 6, the head actuating cam 26 is turned in a clockwise direction together with the mode changeover gear 25 to allow the first flat surface 26a to abut against the tab 20a of the head base 20, so that the head base 20 is pushed in the direction A against the resilience of the spring 27 by the first flat surface 26a.

In the play mode shown in FIG. 6, the head base 20 is pressed in the direction A. Thus, the magnetic head H mounted on the head base 20 is in contact with the magnetic tape T contained in a cassette half, and the tape T is pressed against the capstan shaft 16 by the pinch roller 28.

When the motor M continues rotating in a clockwise direction in the state shown in FIG. 6, the capstan shaft 16 is also rotates in a clockwise direction to cause the tape T sandwiched between the pinch roller 28 and the capstan shaft 16 to run at a fixed speed corresponding to the rotating speed of the capstan shaft 16 to the right shown in FIG. 6. The power of the motor M is transmitted through the driving gear 19 and the planet gear 12 to the reel gear 14 to rotate the winding reel 12 in a clockwise direction. And, a winding tape reel Ra contained in the cassette half is driven for rotation in a clockwise direction to wind the magnetic tape T. In this way, the magnetic head H performs a recording operation or a playback operation of the magnetic tape T which is allowed to run to the right by the capstan shaft 16.

In changing over the mode of the tape player from the stop mode to the play mode, the first flat surface 26a of the head actuating cam 26 is abutted against the tab 20a of the head base 20 very stably. That is, in this conventional mode changeover apparatus, when the first flat surface 26a is abutted against the tab 20a, the first flat surface 26a is shaped to be perpendicular to a center line C passing the rotation axis O of the head actuating cam 26 and extending toward a moving direction of the head base 20, and to extend on the opposite sides of the center line C. Thus, when the first flat surface 26a is abutted against the tab 20a, the force F of the spring 27 is applied on opposite sides of the center line C. Thus, the moment around the rotation axis O produced by the force F is substantially zero or a very small amount. Therefore, when the head actuating cam 26 in an over-stroking phase of the head base 20 shown in FIG. 9A rotates in the direction of an arrow α to reach a normal position of the play mode shown in FIG. 9B, the head actuating cam 26 is never rotated further in the direction of the arrow α by the moment produced by the force F.

Therefore, the head base 20 is surely held at a normal position of the play mode in changing the operating mode from the stop mode to the play mode. In addition, the positional stability of the head actuating cam 26 in the play mode can be improved.

Review Mode:

The changeover to the review mode is effected, for example, by driving the motor M for rotation in a counterclockwise direction in the state shown in FIG. 6 where the motor M is at the position of play mode. That is, when the motor M is driven in a counterclockwise in the state shown in FIG. 6, the driving gear 19 is driven for rotation in a counterclockwise direction, and the planet gear receives a force for turning the planet gear 22 in a counterclockwise direction, whereby the planet gear 22 is engaged with the toothed portion 25a of the mode changeover gear 25. As the motor M continues rotating in a counterclockwise direction, the planet gear 22 continues rotating at the same position to drive the mode changeover gear 25 in a counterclockwise direction. When the non-toothed portion 25a of the mode changeover gear 25 moves to the position of the planet gear 22, the planet gear 22 is disengaged from the edge Ea of the toothed portion 25b, and then the planet gear 22 revolves in a counterclockwise direction around the driving gear 19, and finally engages the reel gear 15 the left-hand gear shown in FIG. 6. During this state, the second flat surface 26b provided on the head actuating cam 26 pushes the tab 20a of the head base 20 to move the head base 20 in the direction A. However, since the distance between the second flat surface 26b and the center O of rotation is smaller than the distance between the first flat surface 26a to be used for changing over the mode to the play mode by the distance t (see FIG. 7), the movement of the head base 20 in the direction A during the changeover to the review mode is slightly smaller than that of the same in the play mode shown in FIG. 6. Therefore, when the head base 20 is moved in the direction A, the pinch roller 28 is separated from the capstan shaft 16, and hence the rotational force of the capstan shaft 16 is not transmitted to the tape T. The magnetic head H is in light contact with the tape T. For example, in the play mode shown in FIG. 6, the magnetic head H is in contact with the tape T to the extent that the tape T is curved. When the motor M is driven for rotation in a counterclockwise direction in this state, the reel gear 15 is rotated in a counterclockwise direction through the planet gear 22, and the supplying reel 13 drives the tape reel Rb to rewind the tape T. At this time, the rotating speed of the motor M is changed to a high speed. While the tape T is being rewound at a high speed, the magnetic head H reads signals recorded on the tape T, thereby enabling automatic seek operation of the record.

In the changeover to the review mode, the second flat surface 26b is also perpendicular to the center line C (see FIG. 9B) and extends on the opposite sides of the center line C. Thus, the moment around the center O of rotation produced by the force F of the spring 27 can be extremely minimized, and hence the head actuating cam 26 and the head base 20 can be held surely and stably at a normal position of the review mode.

According to the above conventional mode changeover apparatus for a tape player, it is necessary to allow the mode changeover gear 25 to rotate in the reverse direction so as to cause over-stroking of the head base 20 by rotation of the mode changeover gear 25 engaged with the planet gear 22 in the changeover to the play mode, and secure a position of rotation of the mode changeover gear 25 for engaging again the planet gear 22. However, if the apparatus is designed to obtain a necessary amount of over-stroking of the head base 20, there is a risk such that the magnetic head H is moved toward the magnetic tape T beyond the optimum position thereof to cause damage to the magnetic tape T and the portions around the magnetic head H.

When the movement of the head base 20 is minimized, it is considered that the resilience of the spring 27 of the head base 20 is strengthened to obtain a sufficient turning force of the mode changeover gear 25 in the reverse (returning) direction. However, according to a mode changeover apparatus of a type in which the spring is also used for biasing the pinch roller 28 to the capstan shaft 16, the pinch roller 28 is pressed into contact with the capstan shaft 16 so strongly, thereby adversely affecting the magnetic tape T or the pinch roller 28. In addition, it is difficult to set optimally the resilience and the biasing force of the spring.

SUMMARY OF THE INVENTION

It is a primary object of the present invention to provide a mode changeover apparatus for a tape player capable of turning a mode changeover gear in the reverse (returning) direction without the shortage of the turning force thereof in the reverse (returning) direction in the event of occurrence of over-stroking of a head base, even if the movement of the head base is reduced to prevent a magnetic head from moving toward a magnetic tape beyond the optimum position thereof during a changeover to the play mode, preventing the magnetic head from moving toward the magnetic tape beyond the optimum position thereof, performing surely a mode changeover operation, reducing a number of parts or components, and achieving space saving.

Another object of the present invention is to provide a mode changeover apparatus for a tape player capable of reducing the movement of a head base in the event of occurrence of over-stroking thereof with a simple construction, and causing surely a biasing force for biasing the head base to act as a turning force for turning the mode changeover gear in the reverse direction at the maximum over-stroking of the head base.

The primary object of the present invention is achieved by providing a mode changeover apparatus for a tape player which comprises: a head base having a magnetic head mounted thereon and movable in the direction in which the magnetic head moves into contact with and away from a magnetic tape, the head base being biased in the direction away from the magnetic tape; a pinch roller rotatably supported by a pinch roller bracket carried by the head base and biased into pressure contact with a capstan shaft; the pinch roller bracket being provided with engaging portions; and a mode changeover gear provided with a head actuating cam, and cam portions on the outer periphery thereof, wherein the head actuating cam actuates the head base by a rotating action thereof in the direction opposite to the biasing direction of the head base, and includes flat surfaces which abut against the head base at a position where the magnetic head is in contact with the magnetic tape to hold said head base at the position, the flat surfaces being shaped to be perpendicular to a center line passing the rotation axis of the head actuating cam and extending toward moving direction of the head base, and to extend on the opposite sides of the center line when abutting against the head base, and wherein the cam portions are engaged with the engaging portions of the pinch roller bracket in the event of occurrence of over-stroking of the head base, thereby providing a turning force to the mode changeover gear in the direction opposite to the direction which causes the over-stroking of the head base.

Another object of the present invention is achieved by providing a mode changeover apparatus for a tape player wherein corner portions of the flat surfaces abutting against the head base in the event of occurrence of the over-stroking of the head base are cut out.

BRIEF DESCRIPTION OF THE DRAWINGS

FIGS. 4A to 4D are explanatory views each showing in turn an operation of a head base and a head actuating cam of a mode changeover apparatus according to an embodiment of the present invention during a mode changeover operation from a stop mode to a play mode;

DESCRIPTION OF THE PREFERRED EMBODIMENT

An embodiment of the present invention will now be described with reference to the accompanying drawings.

Figure 1:
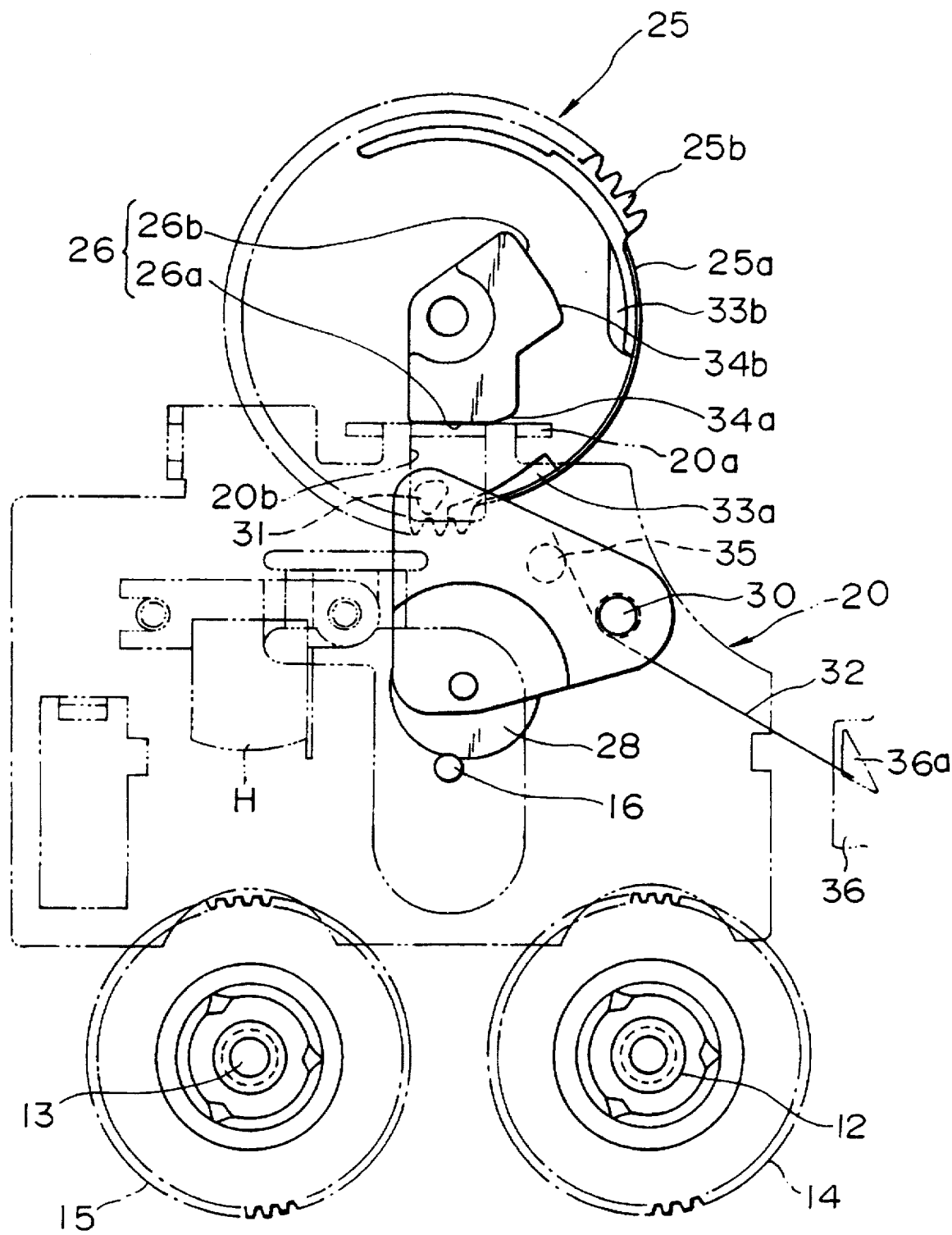
FIG. 1 is a plan view showing a mode changeover apparatus for a tape player according to an embodiment of the present invention in a play mode.
Figure 2A:
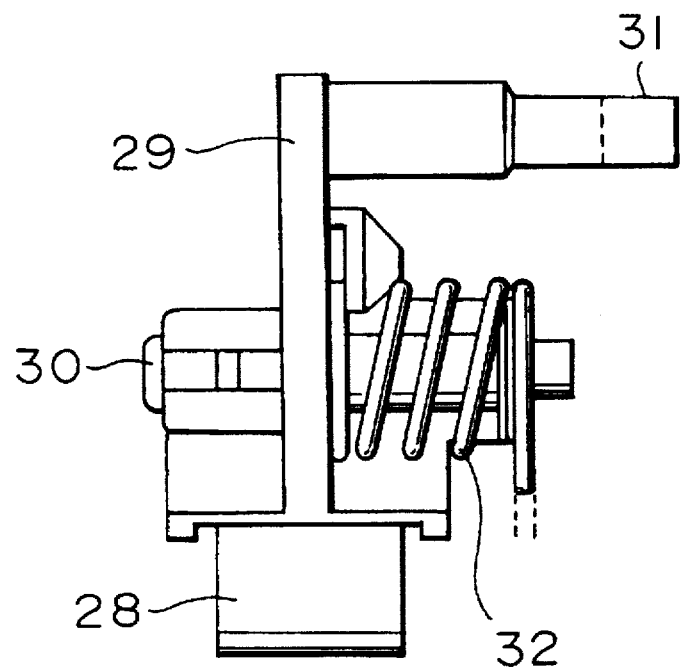
FIGS. 2A and 2B are a plan view and a vertical sectional view showing a pinch roller mechanism of a mode changeover apparatus for a tape player according to an embodiment of the present invention.
Figure 2B:
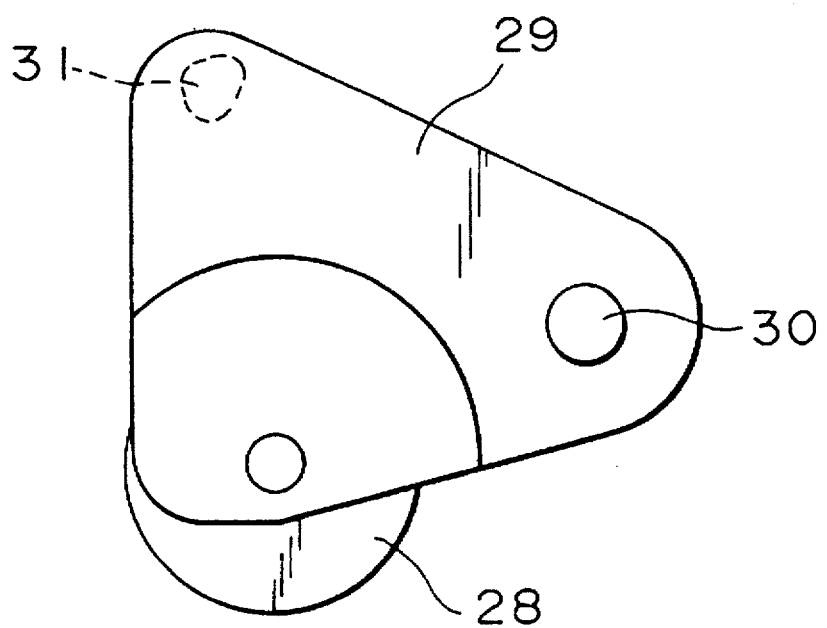
Figure 3A:
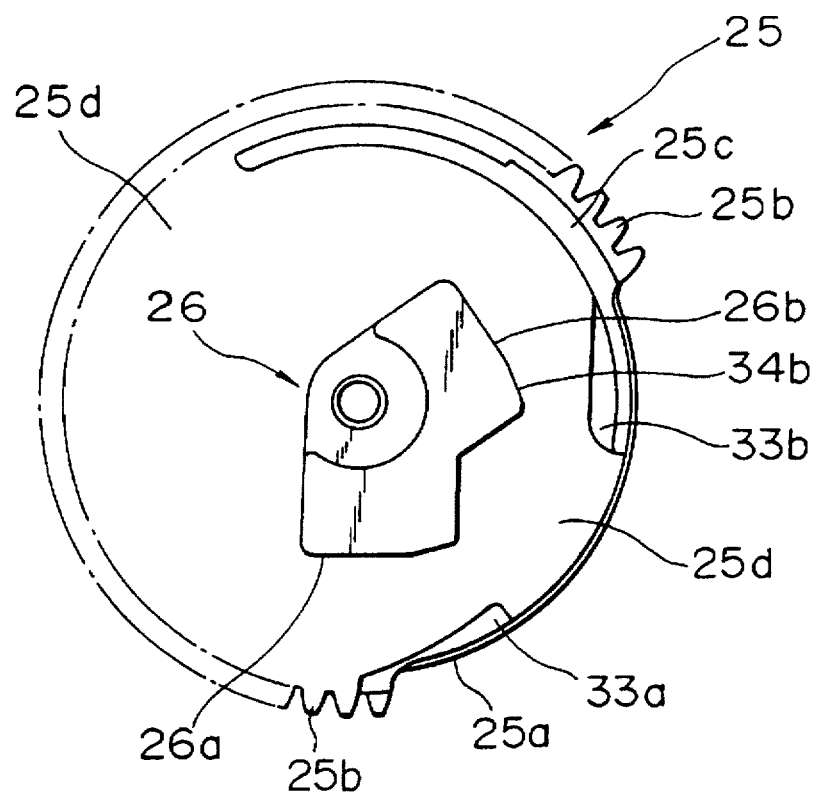
FIGS. 3A and 3B are a plan view and a side view showing a head actuating cam and a mode changeover gear a mode changeover apparatus for a tape player according to an embodiment of the present invention.
Figure 3B:
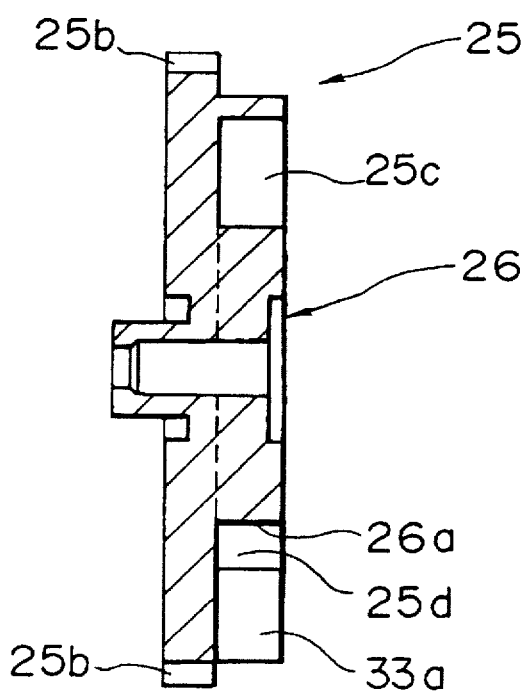
Figure 5:
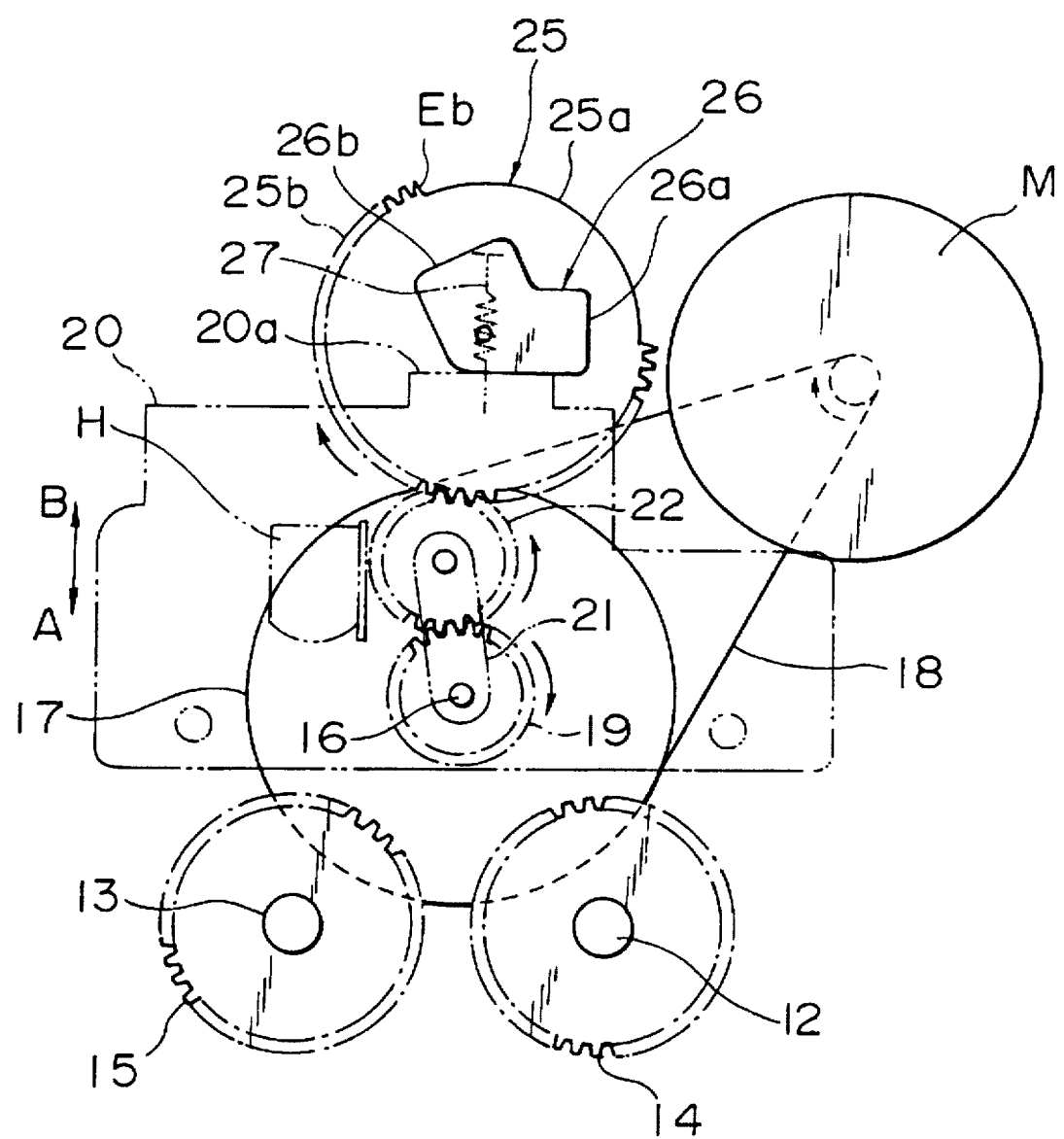
FIG. 5 is a plan view showing a conventional mode changeover apparatus for a tape player in a stop mode.

FIG. 1 is a plan view showing a mode changeover apparatus for a tape player according to an embodiment of the present invention in a play mode; FIGS. 2A and 2B are a plan view and a vertical sectional view showing a pinch roller mechanism of a mode changeover apparatus according to an embodiment of the present invention; FIGS. 3A and 3B are a plan view and a side view showing a head actuating cam and a mode changeover gear of a mode changeover apparatus for a tape player according to an embodiment of the present invention; and FIGS. 4A to 4D are explanatory views each showing in turn an operation of a head base and a head actuating cam of a mode changeover apparatus according to an embodiment of the present invention during a mode changeover from a stop mode to a play mode, in which FIG. 4A shows a state at a temporary play, FIG. 4B shows a state during over-stroking, FIG. 4C shows a state at the maximum over-stroking, and FIG. 4D shows a final play condition, respectively. In these drawings, the same components as those of the prior art as described above are indicated by the same reference numerals to omit detailed description thereof.

A tape player comprises a head base 20 on which a magnetic head H is mounted and movably supported in the directions in which the magnetic head H moves into contact with and away from a magnetic tape T, a torsion coil spring 32 biasing the head base 20 in the direction away from the magnetic tape T, and a mode changeover gear 25 having a head actuating cam 26 for driving the head base 20 by the rotation action thereof in the direction opposite to the biasing direction of the torsion coil spring 32.

The head base 20 slidably moves in the direction (direction A–B) in which the head base 20 moves close to and away from each of the reel base 12 and 13. The head base 20 is biased by a torsion coil spring 32, described later, in the direction (direction B) away from each of the reels 12 and 13. The head base is bent at its rear end portion to form a tab 20a. The tab 20a extends toward a position where it can face with and abut against a first flat surface 26a or a second flat surface 26b. An opening 20b is formed in the head base 20 from a bent portion of the tab 20a, and a boss 31 of a pinch roller bracket 29 to be described later is passed through the opening 20b from above so as to be provided within a moving path of an outer cam 33a or 33b of the mode changeover gear 25 provided below.

The mode changeover gear 25 has a non-toothed portion 25a and toothed portion 25b which are partially formed on the portion other than the non-toothed portion 25a. As shown in FIGS. 3A and 3B, the head actuating cam 26 is formed integrally on the upper surface of the mode changeover gear 25.

The head actuating cam 26 has the first and second flat surfaces 26a and 26b to be abutted against the tab 20a of the head base 20. These first and second flat surfaces 26a and 26b abut against the head base 20 at a position where the magnetic head H is in contact with the magnetic tape T so as to hold the head base 20 at the position. And, the first and second flat surfaces 26a and 26b are shaped to be perpendicular to a center line passing the rotation axis of the head actuating cam 26 and extending toward a moving direction of the head base 20, and to extend on the opposite sides of the center line when the flat surfaces 26a and 26b are abutting against the head base 20. In addition, the first and second flat surfaces 26a and 26b of the head actuating cam 26 have a first and second cut-outs 34a and 34b such that corner portions of the flat surfaces 26a and 26b to be abutted against the head base 20 in the event of occurrence of over-stroking thereof are partially deleted. As in the case of the conventional mode changeover apparatus as described above, the second flat surface 26b is formed smaller than the first flat surface 26a by a short distance t from the rotation axis O of the mode changeover gear 25.

On the outer periphery of the mode changeover gear 25, a first and second outer cam 33a and 33b are provided corresponding to the first and second notches 34a and 34b, respectively. The first and second outer cam 33a and 33b are protruded from the mode changeover gear 25. The inner peripheral surface of the first outer cam 33a is formed into an inclined surface so as to protrude gradually toward the center of the mode changeover gear 25 as the first outer cam 33a moves in a counterclockwise direction in FIG. 1, while the inner peripheral surface of the second outer cam 33b is formed into an inclined surface so as to protrude gradually toward the center of the mode changeover gear 25 as the second outer cam 33b moves in a clockwise direction in FIG. 1. A peripheral wall 25c is partially protruded along the outer periphery of the surface of the mode changeover gear 25 on which the head actuating cam 26 is formed. The second outer cam 33b is formed integrally on the inner peripheral surface near one end of the peripheral wall 25c. Portions between the peripheral wall 25c and outer cam 33a are cut out, respectively to form cut-outs 25d, 25d.

The pinch roller mechanism is, as shown FIGS. 2A and 2B, composed of a pinch roller 28, a pinch roller bracket 29 rotatably supporting the pinch roller 28, a shaft 30 rotatably supporting the pinch roller bracket 29 to the head base 20, and a boss 31 which can be engaged with the outer cam 33a or 33b of the mode changeover gear 25.

The torsion coil spring (elastic member) 32 is wound around the shaft 30, one end thereof is locked with a receiving portion 35 of the pinch roller bracket 29 and the other end thereof is locked with a hole 36a of a chassis 36. By the resilience of the torsion coil spring 32, the boss 31 of the pinch roller bracket 29 is pressed into contact with the outer cam 33a or 33b in the event of occurrence of over-stroking of the head base 20. Therefore, the biasing force of the torsion coil spring 32 biasing the pinch roller 28 into pressure contact with the capstan shaft 16 is converted to a turning force in the direction opposite to that of the movement of the head base 20 in the event of occurrence of over-stroking thereof so as to be given to the mode changeover gear 25 through the boss 31 and the outer cam 33a or 33b. The torsion coil spring 32 biases the head base 20 also in the direction B. Each of the boss 31 of the pinch roller bracket 29 and the outer cam 33a or 33b have tapered surfaces, respectively, so as to be easily engaged.

The operation of the above embodiment will now be described.

In changing over the operation mode from the stop mode to the recording or the playback mode (play mode) shown in FIG. 1, the motor M is driven for rotation in a clockwise direction in a state of the stop mode. When the driving gear 19 is rotated in a clockwise direction by means of the motor M, the planet gear 22 is also turned in a clockwise direction so as to be securely engaged with the toothed portion 25b of the mode changeover gear 25. The power of the motor M is transmitted through the driving gear 19 and planet gear 22 to the mode changeover gear 25 to drive the mode changeover gear 25 for rotation in a clockwise direction. While the mode changeover gear 25 is driven, the planet gear 22 stays at the same position. When the mode changeover gear 25 is rotated to the position shown in FIG. 1, the planet gear 22 is disengaged from the edge Ea of the toothed portion 25b of the mode changeover gear 25. The planet gear 22 disengaged from the edge Ea is allowed to revolve around the driving gear 19 in a clockwise direction and arrives at the position where the planet gear 22 is engaged with the rewinding reel gear 14, as shown in FIG. 1 (play mode). During a changeover from the stop mode to the play mode shown in FIG. 1, the head actuating cam 26 is turned together with the driving gear 19 to allow the first flat surface 26a to abut against the tab 20a of the head base 20 so as to push the head base 20 in the direction A against the resilience of the torsion coil spring 32.

In the play mode shown in FIG. 1, the head base 20 is pressed in the direction A, where the magnetic head H on the head base 20 is in contact with the tape T contained in a cassette half, and the tape T is pressed against the capstan shaft 16 by the pinch roller 28. The motor M continues rotating in a clockwise direction. The capstan shaft 16 also rotates in a clockwise direction to cause the tape T sandwiched between the capstan shaft 16 and the pinch roller 28 to run at a fixed speed corresponding to the rotating speed of the capstan shaft 16 to the right shown in FIG. 1. The power of the motor M is transmitted through the driving gear 19 and planet gear 22 to the reel gear 14 to rotate the rewinding reel base 12 in a clockwise direction. And, a winding tape reel Ra in the cassette half is rotated in a clockwise direction to wind the magnetic tape T.

Figure 6:
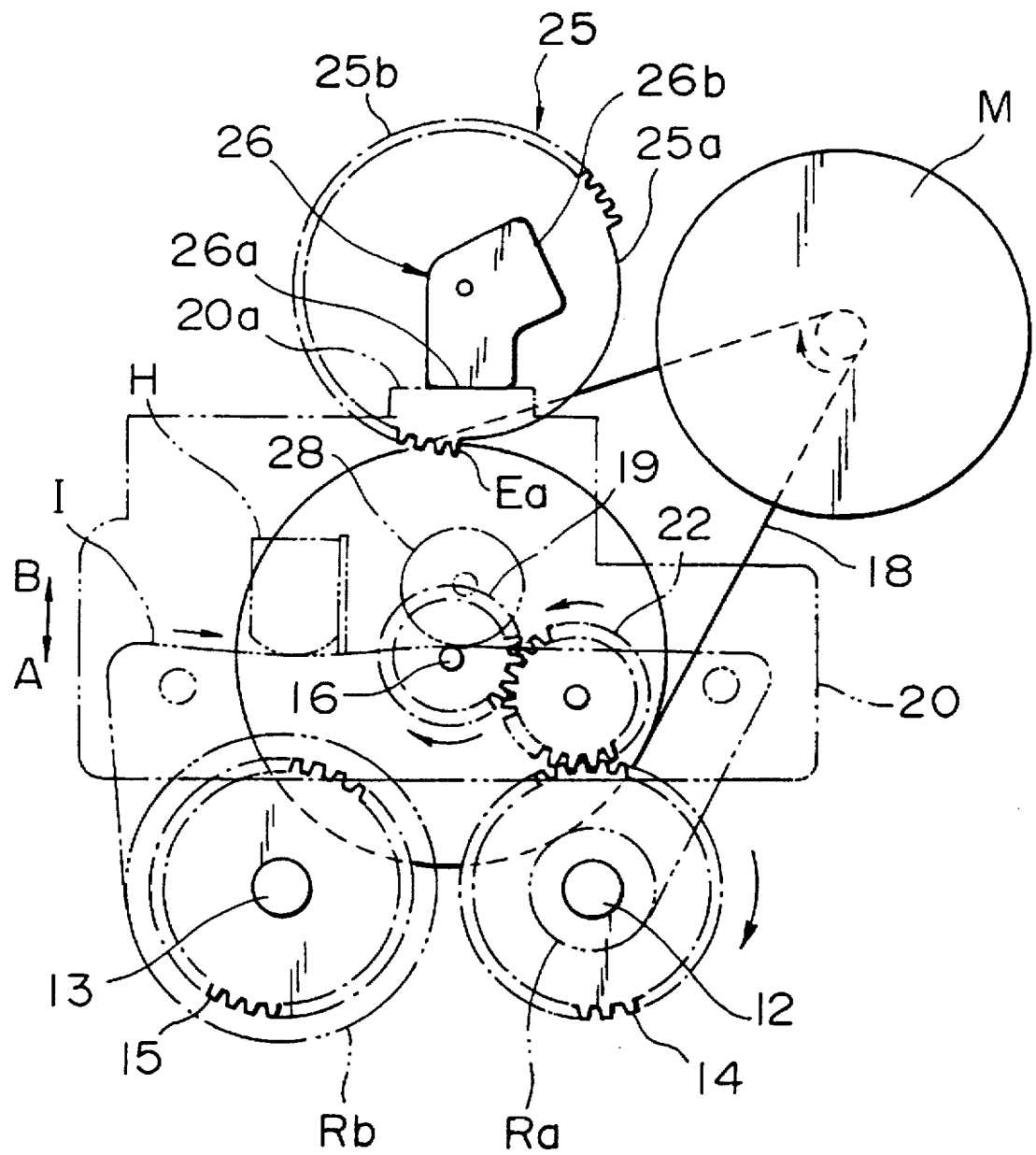
FIG. 6 is a plan view showing a conventional mode changeover apparatus for a tape player in a play mode.
Figure 7:
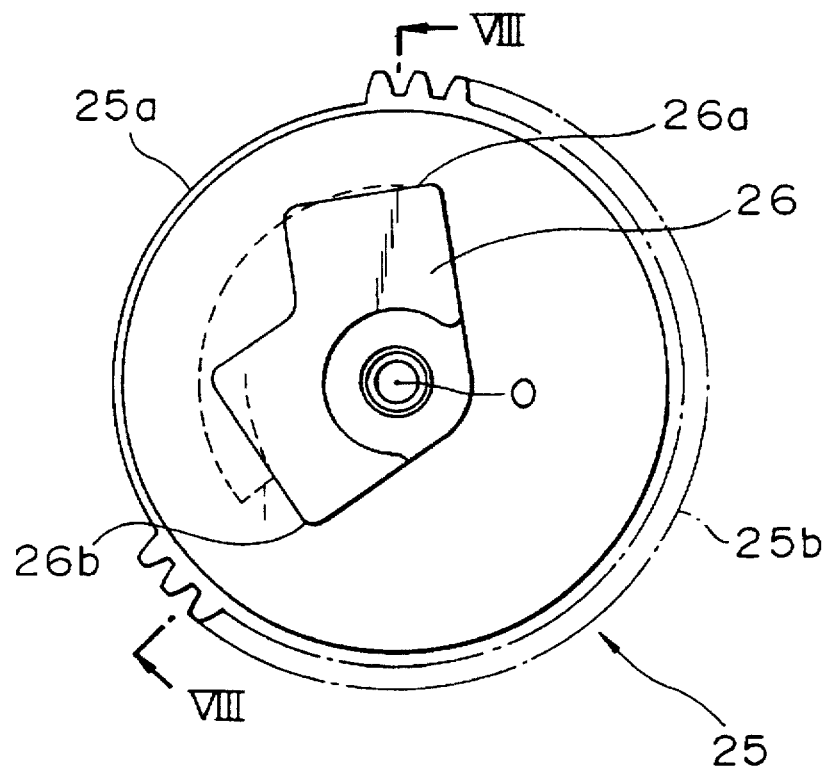
FIG. 7 is a plan view showing a head actuating cam and a mode changeover gear of a conventional mode changeover apparatus for a tape player.
Figure 8:
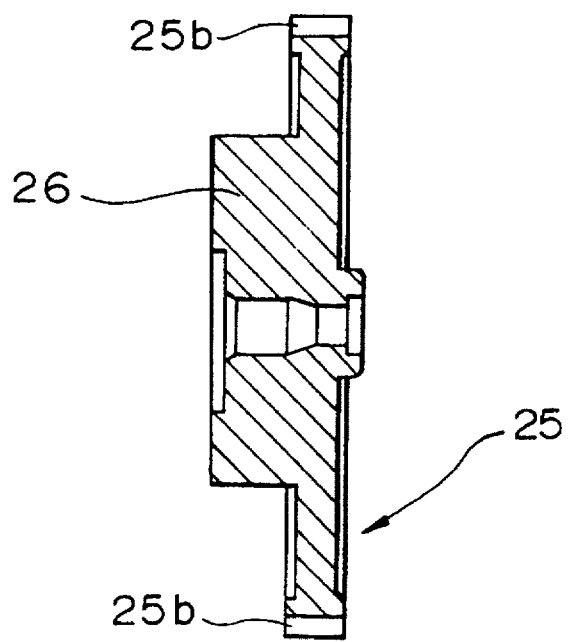
FIG. 8 is a sectional view taken on line VIII—VIII of FIG. 7.
Figure 9A:
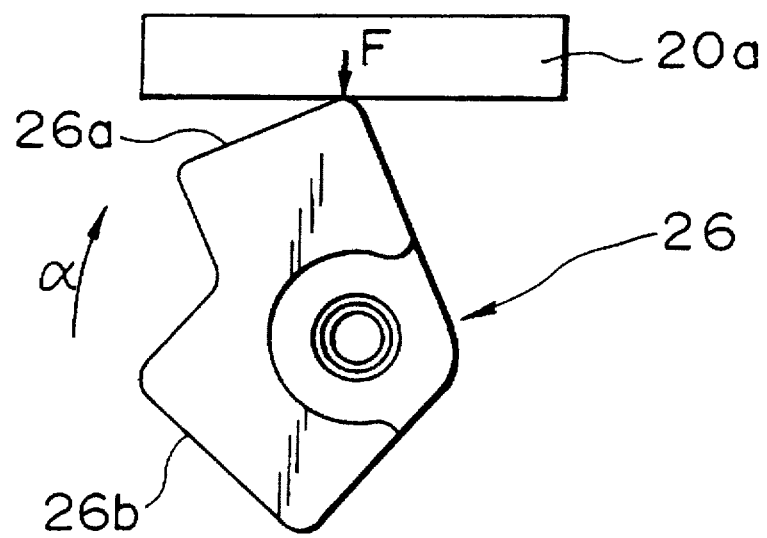
FIGS. 9A and 9B a plan view showing a head actuating cam and a tab of a head base of a conventional mode changeover apparatus for a tape player by operation.
Figure 9B:
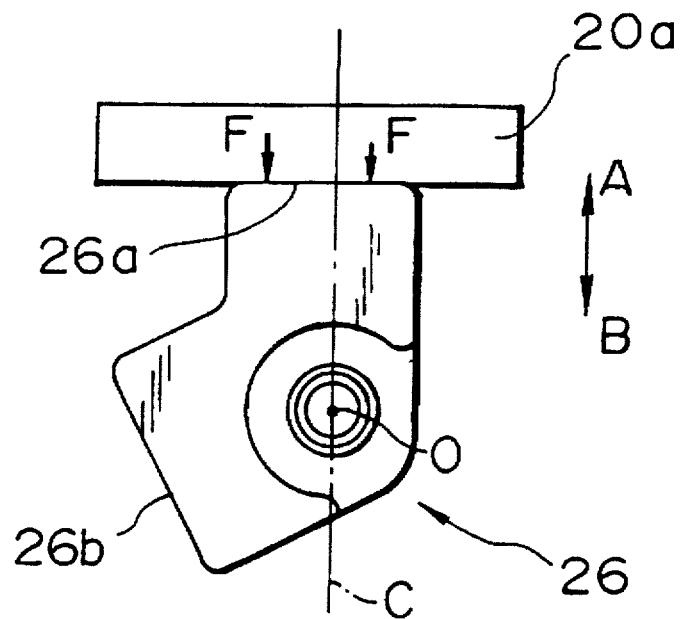

In this embodiment, the recording or playback operation due to the magnetic head H is also performed with respect to the magnetic tape T which is allowed to run to the right by the capstan shaft 16 as in the case of FIG. 6.

The operation of characteristic portions of this embodiment will now be described in detail with reference to FIGS. 4A to 4D, although it partially duplicates the above description of the operation.

As described above, in changing over the mode from the stop mode to the play mode, when the motor M is driven for rotation in a clockwise direction, the mode changeover gear 25 is driven in the clockwise direction and the head actuating cam 26 also rotates in a clockwise direction to allow the first flat surface 26a to abut against the tab 20a of the head base 20, and allow the head base 20 to be pushed in the direction A against the resilience of the torsion coil spring 32. This condition is referred to as a temporary play (during transition). The temporary play condition is the same as the final play condition shown in FIG. 4D and FIG. 1 except that the toothed portion 25b of the mode changeover gear 25 is engaged with the planet gear 25.

In the condition shown in FIG. 4A, the toothed portion 25b is engaged with the planet gear 22. Thus, as shown in FIG. 4B, the head actuating cam 26 is further rotated in a clockwise direction by the rotation of the motor M in a clockwise direction. At the same time, the first outer cam 33a of the mode changeover gear 25 is rotated in a clockwise direction to abut against the boss 31 of the pinch roller bracket 29. Due to the rotation of the first outer cam 33a in a clockwise direction, the boss 31 of the pinch roller bracket 29 slides on the first outer cam 33a to rotate the pinch roller bracket 29 in a clockwise direction around the shaft 30 against the torsion coil spring 32. By this rotating operation, the pinch roller 28 pressed into contact with the capstan shaft 16 is moved in the direction away from the capstan shaft 16, and at the same time, the resilience of the torsion coil spring 32 is converted to a force for turning the mode changeover gear 25 (and the head actuating cam 26) in a counterclockwise direction through the first outer cam 33a inclined from the boss 31 of the pinch roller bracket 29.

The head base 20 is over-stroked in such a manner as described above from the condition shown in FIG. 4A. As the amount of over-stroking of the head base 20 is increased, the movement of the pinch roller 28 in the direction away from the capstan shaft, and the force for turning the mode changeover gear 25 (and the head actuating cam 26) are also increased. At the maximum over-stroking of the head base 20, the condition is changed to that shown in FIG. 4C in which the first cut-out 34a of the head actuating cam 26 abuts against the tab 20b of the head base 20 to push the head base 20 in the direction A against the resilience of the torsion coil spring 32. However, the abutment of the first cut-out 34a against the tab 20a of the head base 20 reduces the movement of the head base 20, i.e. the amount of protrusion of the magnetic head H smaller than ever.

At the same time, when the condition is changed to that shown in FIG. 4C, the non-toothed portion 25a of the mode changeover gear 25 moves to the position of the planet gear 22 so that the planet gear 22 engaged with the toothed portion 25b of the mode changeover gear 25 is disengaged from the edge Ea of the toothed portion 25b of the mode changeover gear 25. When the toothed portion 25b of the mode changeover gear 25 is disengaged from the planet gear 22, the mode changeover gear 25 becomes free from the engagement. And, in the condition shown in FIG. 4C, the resilience of the torsion coil spring 32 is transmitted through the tab 20a of the head base 20 to the first notch 34a of the head actuating cam 26 to turn the mode changeover gear 25 in a counterclockwise direction. If the head base actuating cam 26 is not provided with the cut-out 34a, and is a cam having only a width of the first flat surface 26a, the tab 20a of the head base 20 acts on the corner portions of the head actuating cam 26 in the condition of FIG. 4C (i.e. at the maximum over-stroking of the head base 20) toward substantially the center of the mode changeover gear 25. Thus, it becomes impossible to turn the mode changeover gear 25 in a counterclockwise direction. The present invention solves this problem by providing the cut-out 34a. In addition, in the condition shown in FIG. 4C, the resilience of the torsion coil spring 32 acts as a force for turning the mode changeover gear 25 in a counterclockwise direction through the first outer cam 33a of the mode changeover gear 25 inclined from the boss 31 of the pinch roller bracket 29. The mode changeover gear 25 is turned by both of the forces in a counterclockwise direction to change the condition into the final play condition.

In this condition, the tab 20a of the head base 20 biased by the resilience of the torsion coil spring 32 is pressed into contact with the first flat surface 26a so that the first flat surface 26a can be abutted against the tab 20a very stably.

In addition, since the boss 31 is disengaged from first the outer cam 33a, the resilience due to the boss 31 does not act on the mode changeover gear 25.

Even in the event of occurrence of over-stroking of the head base 20 in the review mode as described in the conventional mode changeover apparatus, the action of the mode changeover apparatus is similar to that as described above. The construction and operation of the mode changeover apparatus which are not particularly described in the above embodiment are similar to those of the conventional mode changeover apparatus.

In the embodiment described above, a tape player which can drive the capstan shaft, a pair of reels and head base with one motor is described. However, the prevent invention is not limited thereto. The present invention can be widely applied to the tape player as long as it has a mechanism for moving the head base with a head actuating cam, and for holding the head actuating cam and head base at the position of the play mode by a force of biasing member for biasing the head base, such as the tape player provided with one motor for driving the capstan shaft and a pair of reels, and one solenoid for driving the head base.

In addition, according to the above embodiment, biasing of the torsion coil spring 32 toward the pinch roller 28 is utilized. However, another spring may be provided in place of the torsion coil spring 32.

Furthermore, according to the above embodiment, the first and second cut-outs 34a and 34b are provided to reduce the movement of the head base 20 at the maximum over-stroking thereof. However, the movement of the head base 20 can be reduced by, for example, narrowing the widths of the first and second flat surfaces 26a and 26b of the head actuating cam 26.

According to the embodiment thus constituted, when a mode changeover apparatus comprises: the head base 20 having the magnetic head H thereon and being supported movably in the direction in which the magnetic head H moves into contact with and away from the magnetic tape T; the pinch roller 28 rotatably supported by the pinch roller bracket 29 carried by the head base 20 and biased into pressure contact with the capstan shaft 16; the engaging portions provided on the pinch roller bracket 29; the head actuating cam 26 actuating the head base 20 in the direction opposite to the biasing direction of the head base 20 by its rotating action; the mode changeover gear 25 provided with the head actuating cam 26, and cams 33a and 33b on the outer periphery thereof; and the first and second flat surfaces 26a and 26b which are formed on the head actuating cam 26 and abut against the head base 20 at a position where the magnetic head H is in contact with the magnetic tape T to hold the head base 20 at this position and which are shaped to be perpendicular to a center line passing the rotation axis of the head actuating cam 26 and extending toward the moving direction of the head base 20, and to extend on the opposite sides of the center line when abutting against the head base 20, and when the head actuating cam 26 is formed to reduce the maximum pressing amount of the head base 20, a turning force in the direction opposite to the direction which causes the over-stroking of the head base 20 is given to the mode changeover gear 25 by the engagement of the boss 31 of the pinch roller 29 with the cams 33a and 33b in the event of occurrence of over-stroking of the head base 20. Therefore, even if the movement of the head base 20 is reduced to prevent the magnetic head H from moving toward the magnetic tape T beyond the optimum position thereof in the changeover to the play mode or the like, the mode changeover gear 25 can be turned in the returning direction thereof without the shortage of the turning force in the returning direction in the event of occurrence of over-stroking of the head base 20, thus preventing the magnetic head H from moving toward the magnetic tape T beyond the optimum position thereof and achieving a sure changeover operation to the play mode or another mode. In addition, a biasing member for biasing the pinch roller 28 in the direction away from the capstan shaft 16 is shared and pinch roller bracket 29 is provided with the engaging portions, thereby minimizing the number of parts or components and achieving space saving.

Further, according to the foregoing embodiment, in the event of occurrence of the over-stroking of the head base 20, the pinch roller 28 of the pinch roller bracket 29 is rotated by the outer cam 33a or 33b of the mode changeover gear 25 in the direction away from the capstan shaft 16 so that the magnetic tape T is free from engagement. Thus, even if the magnetic head H moves toward the magnetic tape T beyond the optimum position thereof in the event of occurrence of over-stroking of the head base 20, damage to the magnetic tape T can be prevented.

Still further, according to the foregoing embodiment, the corner portions of the flat surfaces 26a and 26b are cut out to form the first and second cut-outs 34a and 34b in the event of occurrence of the over-stroking of the head base 20. Therefore, the movement (the amount of over-stroking) of the head base 20 in the event of occurrence of the over-stroking thereof can be minimized, and a biasing force of the head base 20 can be surely allowed to act as a turning force of the mode changeover gear 25 in the reverse direction at the maximum over-stroking of the head base.

The mode changeover apparatus of the present invention as claimed in claim 1 offers the following advantages. The mode changeover gear can be turned in the reverse (returning) direction without the shortage of the turning force in the reverse (returning) direction in the event of occurrence of the over-stroking of the head base, even if the movement of the head base is minimized to prevent the magnetic head from moving toward the magnetic tape beyond the optimum position thereof during a changeover to the play mode and the like. The magnetic head is prevented from moving toward the magnetic tape beyond the optimum position thereof. A sure changeover operation to the play mode or another mode can be achieved. The number of parts or components can be minimized, thus achieving space saving.

The mode changeover apparatus of the present invention as claimed in claim 2 offers the following advantages. The movement of the head base in the event of occurrence of the over-stroking of the head base can be minimized with a simple construction. The biasing force of the head base can be surely allowed to act as a turning force of the mode changeover gear in the reverse direction at the maximum over-stroking of the head base.

What is claimed is:

1. A mode changeover apparatus for a tape player, comprising:

a head base having a magnetic head mounted thereon and movable in the direction in which said magnetic head moves into contact with and away from a magnetic tape which is mounted on said tape player, said head base being biased in the direction away from said magnetic tape;

a pinch roller mechanism including a pinch roller bracket rotatably mounted on said head base, and a pinch roller rotatably supported on said pinch roller bracket and biased into pressure contact with a capstan shaft, said pinch roller bracket being provided with an engaging portion; and a mode changeover gear provided with a head actuating cam, and cam portions on the outer periphery thereof, wherein said head actuating cam pushes said head base in the direction opposite to the biasing direction of said head base when said mode changeover gear is driven to rotate, and said head actuating cam includes flat surfaces which abut against said head base when the mode changeover gear is rotated into a play position in which said magnetic head is in contact with said magnetic tape, said flat surfaces being perpendicular to a center line passing through the rotation axis of said mode changeover gear and including cut-out corner portions, and wherein, when the mode changeover gear rotates past the play position into an over-stroke position, of said cam portions engages with the engaging portion of said pinch roller bracket, and the cut-out portion of one of the flat surfaces presses against the head base, thereby applying a turning force to said mode changeover gear such that the mode changeover gear is rotated from the over-stroke position into the play position.

2. A mode changeover apparatus for a tape player according to claim 1, wherein the cam portions include a first outer cam portion and a second outer cam portion formed into an inclined surface so as to protrude gradually from the outer periphery toward the rotation axis of the mode changeover gear.

3. A mode changeover apparatus for a tape player according to claim 1, wherein the tape player further comprises a chassis and a capstan shaft, wherein the pinch roller mechanism further comprises a torsion coil spring having a first end received in a hole formed in the chassis, and a second end connected to a receiving portion of the pinch roller bracket, and wherein the torsion coil spring biases the pinch roller against the capstan shaft when the mode changeover gear is in the play position, and the torsion coil spring biases the mode changeover gear from the over-stroke position to the play position by contact between the engaging portion and one of the cam portions.

* * * * *